United States Patent
Nuzzi

(10) Patent No.: US 11,681,999 B2
(45) Date of Patent: *Jun. 20, 2023

(54) SYSTEMS AND METHODS EMPLOYING A ROUTER FOR ELECTRONIC TRANSACTIONS

(71) Applicant: PayPal, Inc., San Jose, CA (US)

(72) Inventor: Frank Anthony Nuzzi, Pflugerville, TX (US)

(73) Assignee: PayPal, Inc., San Jose, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/368,823

(22) Filed: Jul. 6, 2021

(65) Prior Publication Data

US 2021/0334783 A1 Oct. 28, 2021

Related U.S. Application Data

(63) Continuation of application No. 15/850,516, filed on Dec. 21, 2017, now Pat. No. 11,055,690.

(51) Int. Cl.
*G06Q 40/00* (2023.01)
*G06Q 20/32* (2012.01)
(Continued)

(52) U.S. Cl.
CPC ......... *G06Q 20/325* (2013.01); *G06Q 20/027* (2013.01); *G06Q 20/10* (2013.01);
(Continued)

(58) Field of Classification Search
CPC .... G06Q 40/00; G06Q 20/325; G06Q 20/027; G06Q 20/10; G06Q 20/3224; G06Q 20/40; G06Q 40/02; H04W 88/00; H04W 88/08
See application file for complete search history.

(56) References Cited

U.S. PATENT DOCUMENTS 7,725,392 B2 5/2010 King
9,911,290 B1 3/2018 Zalewski et al.
(Continued)

FOREIGN PATENT DOCUMENTS

CN      103402242 A    11/2013
WO      2013138195 A1   9/2013
WO      WO-2013166507 A1 * 11/2013 ............. G06Q 20/02

OTHER PUBLICATIONS

Real-time payments for mobile Ip H Tewari, D O'Mahony—IEEE Communications Magazine, 2003—ieeexplore.ieee.org (Year: 2003).*

(Continued)

*Primary Examiner* — Lalita M Hamilton
(74) *Attorney, Agent, or Firm* — Haynes and Boone, LLP

(57) ABSTRACT

A system, including: a non-transitory memory; and one or more hardware processors coupled to the non-transitory memory and configured to read instructions from the non-transitory memory to cause the system to perform operations including: receiving a transaction request from an endpoint device on a network, wherein the endpoint device is registered with a transaction service provider; locating, based on the transaction request, an authorization token corresponding to a payment mechanism, wherein the authorization token is stored to a memory device of the router; in response to receiving the transaction request, transmitting the authorization token to the transaction service provider to retrieve transaction information from the transaction service provider, wherein the transaction information includes payment data for a user of the endpoint device; and transmitting the transaction information to the upstream network location, wherein the upstream network location includes a merchant server.

20 Claims, 6 Drawing Sheets

(51) Int. Cl.
 H04W 88/08 (2009.01)
 G06Q 20/40 (2012.01)
 G06Q 20/10 (2012.01)
 H04W 88/00 (2009.01)
 G06Q 40/02 (2023.01)
 G06Q 20/02 (2012.01)
(52) U.S. Cl.
 CPC ......... *G06Q 20/3224* (2013.01); *G06Q 20/40* (2013.01); *G06Q 40/02* (2013.01); *H04W 88/00* (2013.01); *H04W 88/08* (2013.01)

(56) References Cited

U.S. PATENT DOCUMENTS

| | | | |
|---|---|---|---|
| 2007/0282741 | A1 | 12/2007 | Kumar et al. |
| 2010/0306367 | A1 | 12/2010 | Sweeney et al. |
| 2011/0313926 | A1 | 12/2011 | Templeton |
| 2012/0136790 | A1 | 5/2012 | Templeton |
| 2012/0296813 | A1 | 11/2012 | Templeton |
| 2012/0296814 | A1 | 11/2012 | Templeton |
| 2012/0310833 | A1 | 12/2012 | Templeton |
| 2014/0337060 | A1 | 11/2014 | Golembiewski |
| 2015/0188949 | A1 | 7/2015 | Mahaffey et al. |
| 2016/0071083 | A1 | 3/2016 | Apps |
| 2016/0127364 | A1 | 5/2016 | Robison, Jr. et al. |
| 2016/0205442 | A1 | 7/2016 | Yee et al. |
| 2016/0219024 | A1 | 7/2016 | Verzun et al. |
| 2016/0328714 | A1 | 11/2016 | Lee et al. |
| 2016/0358385 | A1 | 12/2016 | Ziebell et al. |
| 2017/0012988 | A1 | 1/2017 | Turgeman et al. |
| 2017/0169234 | A1 | 6/2017 | Camiel |
| 2017/0171314 | A1 | 6/2017 | Britt |
| 2017/0221032 | A1 | 8/2017 | Mazed |
| 2018/0359811 | A1 | 12/2018 | Verzun et al. |
| 2019/0109713 | A1 | 4/2019 | Clark et al. |
| 2019/0386969 | A1 | 12/2019 | Verzun et al. |

OTHER PUBLICATIONS

Amit., "How to Integrate Payments in IoT Devices?", from https://letstalkpayments.com/how-tontegrate-payments-in-iot-devices/, https://letstalkpayments.com/how-tontegrate-payments-in-iot-devices/, May 27, 2015, 4 pages.

Global light vehicle OE connectivity market-forecasts to 2029, Just-auto; Bromsgrove, Oct. 2014, 169 pages.

International Appl No. PCT/US2018/066945, International Search Report and Written Opinion dated Mar. 14, 2019, 10 bages.

Liggett J., "5 innovative IoT payment products", Jul. 29, 2016, from "http://www.tearsheet.co/changing-payments/5-innovative-iot-payment-products" title=Link: http://www.tearsheet.co/changing-payments/5-innovative-iot-payment-products, http://www.tearsheet.co/changing-payments/5-innovative-iot-payment-products/, 4 pages.

Lloyd C., "How to Order Almost Anything from Amazon Using the Amazon Echo", Jul. 29, 2016, from https://www.howtogeek.com/262561/how-to-order-almost-anythng-from-amazon-using-the-amazon-echo/, https://www.howtogeek.com/262561/how-to-order-almost-anythng-from-amazon-using-the-amazon-echo/, 12 pages.

Moore R, "Machine to Machine Payments: It's Not Just for Sci-Fi Anymore", Feb. 14, 2017,Retrived from: https://www.sys.com/news-innovation/whats-new/Articles-and-Biogs/nGenuity-Journal/machine-to-machine-payments-its-not-iustor-sci-fi-anymore.html title=Link: https://www.sys.com/news-innovation/whats-new/Articles-and-Biogs/nGenuity-Journal/machine-to-machine-payments-its-not-justor-sci-fi-anymore.html, https://www.sys.com/news-innovation/whats-new/Articles-and-Biogs/nGenuity-Journal/machine-to-machine, 3 pages.

Moore R., "What IOT Payments Needs to Succeed: A Common Infrastructure", Oct. 10, 2017, Retrieved from: https://www.tsys.com/news-innovation/whats-new/Articles-and-Biogs/nGenuity-Journal/what-iot-payments-needs-to-succeed-a-common-infrastructure.html, https://www.tsys.com/news-innovation/whats-new/Articles-and-Biogs/nGenuity-Journal/what-iot-payments, 3 pages.

Shah S., "IBM and Visa team up for IoT-enabled payments", Feb. 17, 2017, Retrieved from: https://internetofbusiness.com/IBM-visa-iot-payments/, https://internetofbusiness.com/ibm-visa-iot-payments/, 2 pages.

"Visa brings secure payment solutions to the Internet of Things", Retrived from: https://usa.visa.com/visa-everywhere/nnovation/visa-brings-secure-payments-to-the-internet-of things.html, https://usa.visa.com/visa-everywhere/innovation/visa-brings-secure-payments-to-the-internet-of-thing, 3 pages.

* cited by examiner

US 11,681,999 B2

SYSTEMS AND METHODS EMPLOYING A ROUTER FOR ELECTRONIC TRANSACTIONS

RELATED APPLICATIONS

This application is a continuation of U.S. application Ser. No. 15/850,516, filed Dec. 21, 2017, which is hereby incorporated by reference in its entirety.

BACKGROUND

Field of the Disclosure

The present disclosure generally relates to electronic and/or mobile computing device transactions, and more particularly to systems and methods using routers to manage user data for electronic transactions.

Related Art

More and more consumers are purchasing items and services and/or otherwise conducting transactions over electronic networks such as, for example, the Internet. Consumers routinely purchase products and services from merchants and individuals alike. The transactions may take place between a merchant and the consumer, and payment is typically made by entering credit card or other financial information. Transactions may also take place with the aid of an on-line or mobile transaction service provider such as, for example, PayPal, Inc. of San Jose, Calif. Such electronic transaction service providers can make transactions easier and safer for the parties involved. Conducting transactions with the assistance of a service provider from the convenience of virtually anywhere using a mobile device is one main reason why on-line and mobile transactions are growing very quickly.

On-line and mobile transactions may include transmitting secure information between various entities. However, storing and transmitting secure information may open some transactions up to being compromised by a malicious user. Furthermore, endpoint devices (which may be Internet-of-things ("IOT") devices) frequently do not have security and other capabilities to effectuate reliable and secure transactions.

Figure 1:
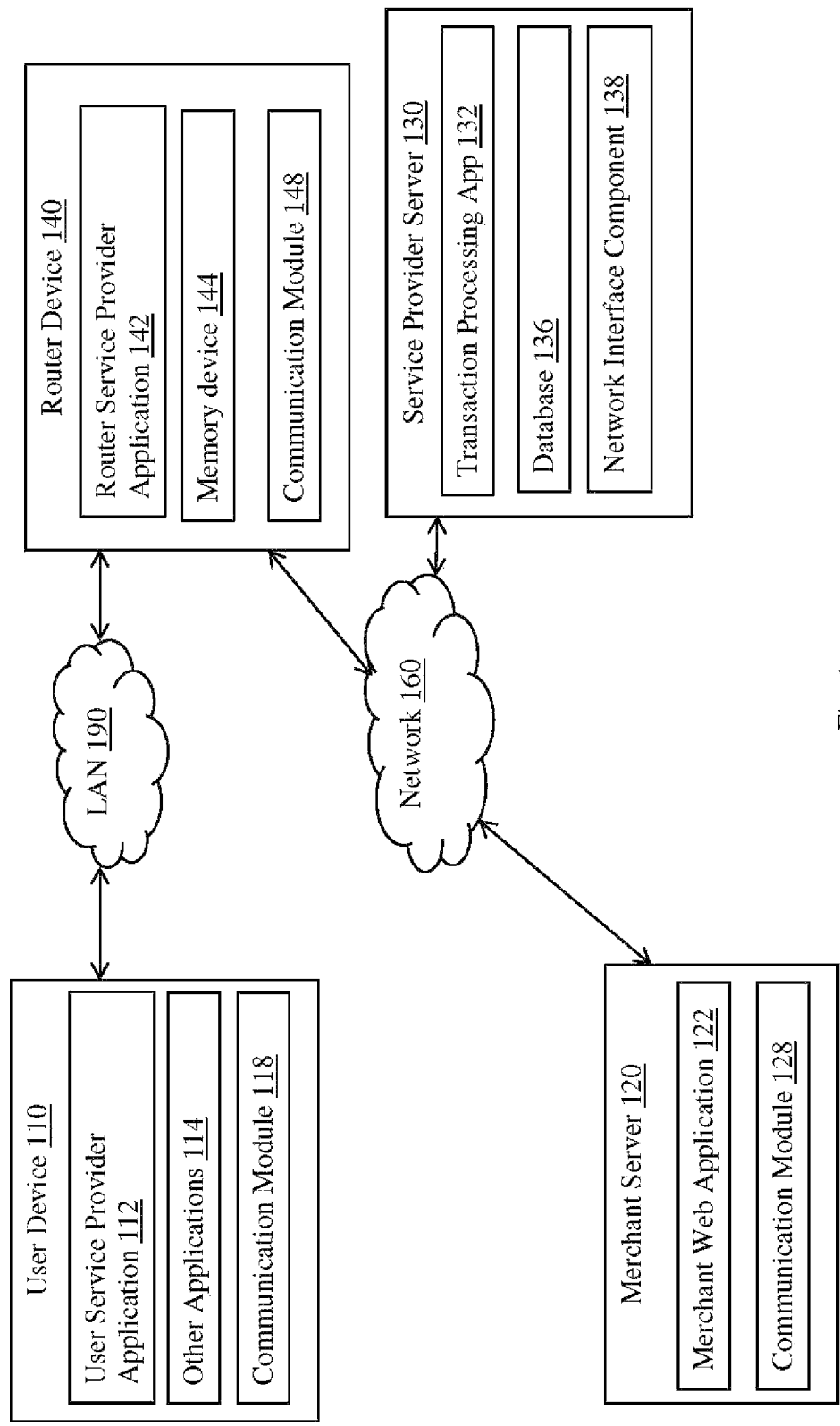
FIG. 1 is an illustration of an electronic processing system, including multiple components communicatively coupled via a network, according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Conducting on-line transactions typically requires the consumer to provide a funding source, such as a credit card. However, it is not uncommon that a consumer's credit card may be compromised. For instance, one or more malicious actors may gain access to the credit card's number, expiration date, and user's name and use that information to make fraudulent transactions. Issuing banks are generally quick to detect the fraud and to cancel affected cards, but this may leave consumers in an inconvenient position. For instance, a consumer may have credit card information stored at a multitude of different merchant websites, and in fact, the consumer may have multiple different credit cards and have information for various ones of those credit cards distributed among a large number of merchant websites. When a given credit card is canceled and replaced, the consumer may have to remember which merchant websites a credit card has been used with and then manually change that credit card information at the various merchant websites.

Furthermore, some Internet of Things (IOT) devices may have limited interfaces and limited ability to perform security functions. In one example, an IOT device may only include a pushbutton interface and have basic hardware and software underneath. Thus, while more sophisticated devices such as smart phones may be able to perform complex encryption algorithms or payment token generation, some IOT devices may not have hardware or software capabilities required of those functions. Thus, providing safe and convenient payment from an IOT device has proven challenging. Thus, there is a need for systems and methods capable of providing safe and efficient electronic transactions with a variety of different websites as well as increasing user convenience.

The present disclosure describes systems and methods having routers that manage user information to facilitate electronic transactions. In one example, a router is registered with a transaction service provider and is associated with a user account of that transaction service provider. The router may store an authorization token locally in its volatile or nonvolatile memory, where that token may be used to request payment data from the transaction service provider.

In one example use case, a user carries a mobile computing device that has an electronic transaction service provider application running thereon. The user desires to make an electronic transaction and communicates with a merchant website using the transaction service provider application. The user's mobile device is on a local area network (LAN) serviced by the router (e.g., the router may route packets between the LAN and the Internet Service Provider, ISP). The router may run an application that determines that the transaction service provider application is attempting to make payment, and in response, the router accesses the payment token from its memory and sends that authorization token to the transaction service provider as a request for transaction information. The transaction services provider verifies the authorization token and returns transaction information, including payment data for the user, to the router.

Continuing with the example use case, the router may then transmit the transaction information to the merchant website. In one example, the message from the user's transaction service provider application includes a payment request in a header of a Hyper Text Transfer Protocol (HTTP) message. A payment request may include a non-standard header or a status code (e.g., 402 Payment Required) that is understood by an application at the router to be a request for transaction information. The application at the router may then inject the payment data into that header or another header and transmit the HTTP message to the merchant website.

In another example, the application at the router acts similarly to a browser, inputting the transaction information into fields that are recognized by the merchant's website. In such an example, the application at the router may generate a new HTTP message with the transaction information, formatted to conform to the fields of the merchant website, in a body of the new HTTP message. Once the transaction information has been sent to the merchant's website via the HTTP message, the application at the router may then delete the transaction information so that sensitive user information is not stored at the router.

In various embodiments, the router may service a variety of different devices. For instance, the example above describes a user's mobile device, although other embodiments may include an electronic transaction being initiated by an Internet of things (IOT) device. IOT devices may be smaller, less powerful, and less feature-rich than their general purpose counterparts. For instance, some IOT devices may lack an alphanumeric input device, such as a keyboard or touchscreen. Rather, some IOT devices may instead have one or maybe two pushbuttons as an interface. Similarly, some IOT devices may lack a monitor device to render alphanumeric information, instead having no interactive visual interface or include one or only a few LEDs. Furthermore, some IOT devices may lack web browsing capability or may lack a generalized computer operating system and also not permit installation of applications or other programs by a user. While there is no standard form or format for IOT devices, a general rule is that they may have less functionality than either a smart phone or a laptop computer.

Various embodiments may facilitate electronic transactions using IOT devices by providing a relatively safe and easy technique for managing transaction information. For instance, in the example above, the router application may store an authorization token, rather than the user's payment data, and then use that authorization token to access user payment data in response to a request for payment. Such embodiments may allow the IOT device to avoid storing user payment data as well, instead putting the burden on the router to manage payment. In fact, this advantage applies just as well to other devices, such as smart phones and laptop computers.

Continuing with the example, various embodiments may provide security measures to avoid the user's payment data or other information the user may not want unauthorized users or entities to have being compromised. In one example embodiment, the router has an application that provides a registration interface to receive user account information for a transaction service provider. For instance, the user may input her user account information (e.g., credentials for the user's with PayPal, Inc.) to the application on the router using the interface. In response to the user's request to register the router, the application at the router may transmit the user account information and information identifying the router to the transaction service provider. The transaction service provider verifies the account, stores the router information, links the router information to the account, and generates an authorization token. The transaction service provider may then download the authorization token to the application on the router, which stores the authorization token in local memory on the router.

Additional security measures may include registering various endpoint devices (e.g., user mobile devices, IOT devices, and the like) with the transaction service provider as well. For instance, another embodiment includes the application at the router having a registration interface allowing a user to request to register various endpoint devices. In response to the request to register an endpoint device, the router transmits a message to the transaction service provider including information to identify the endpoint device and perhaps the authorization token as well. The transaction service provider in response may then verify the authorization token and save the endpoint device identifying information to link the endpoint device to the user account. In some embodiments, the transaction service provider may include as a precondition for processing a payment that the router and endpoint device used to make the payment both be registered. An advantage of some embodiments is that such security procedures may prevent the user's account from being compromised through theft of the authorization token or from a malicious user attempting to make purchases from an unauthorized device logged onto the user's LAN.

Further, various embodiments may include other advantages as well. For instance, the router storing the authorization token may reduce the desire for the consumer to store user payment data at a variety of different merchant websites. Rather, the user may be motivated to allow the router to manage payment data, through use of the authorization token and with assistance from the transaction service provider. Accordingly, should a credit card number be canceled and replaced, the user may update such information at the transaction service provider and avoid having to change such information at a large multitude of merchant websites. This may provide increased convenience for the user. Note that although the various embodiments are described with respect to payment data, other user sensitive information may also apply to the systems and methods described here. Examples of other user sensitive information include, but are not limited to, date of birth, mother's maiden name, all or part of a social security number, mailing address, answers to security questions, passwords, and user names.

Further example embodiments may omit transmitting payment data for the user from the transaction service provider to the router. For instance, the endpoint device may transmit the transaction request to the merchant via the router, and the router may begin the process of requesting payment in response to the transaction. The router may generate a payment request by including an identification of itself, an identification of the endpoint device, an identification of the transaction (e.g., an order number), an identification of the merchant, or other appropriate information. The router may then transmit that payment request to the transaction service provider, and the transaction service provider may then facilitate payment on behalf of the endpoint device and merchant device. Such embodiments may or may not store an authorization token at the router. An advantage of such embodiments is that they may minimize or avoid transmitting user payment data thereby increasing security.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, a merchant server 120, a service provider server 130, and router device 140 in communication over a network 160. A user (not shown) may utilize user device 110 for a variety of different functions, including making purchases via user service provider application 112.

User device 110, merchant server 120, service provider server 130, and router device 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Router device 140 may be implemented as a hardware router device, positioned between user device 110 on LAN 190 and an Internet Service Provider (ISP) that allows access to network 160. Router device 140 includes data lines (not shown) to service LAN 160 and to provide access to the ISP. In this example, router device 140 may include hardware and software to implement switching logic to direct data packets among the various data lines according to layer 2 and layer 3 protocols (e.g., IEEE 802.11, TCP/IP, Ethernet, and the like). Router device 140 in various embodiments may wirelessly receive, via an antenna, outbound data packets from an endpoint device (e.g., user device 110) and transmit the outbound data packets to an upstream network location (e.g., merchant server 120) and then also receive, from the upstream network location, inbound data packets and transmit the inbound data packets to the endpoint device via the antenna.

Router device 140 may include a processor (not shown) and a memory device 144. The processor may execute computer code to implement a router operating system on which the packet switching functionality is provided. An example of an operating system that may be used in some embodiments includes LINUX® OS, though the scope of embodiments is not limited to any particular operating system. Router device 140 may also include router service provider application 142, which may include an application that runs on top of the router operating system. Router service provider application 142 in this example includes a code base that is executed by the processor to provide the transaction functionality described herein. For instance, the router service provider application 142 may determine that the user device 110 is requesting a transaction, store an authorization token in memory device 144 and retrieve the authorization token therefrom, request user payment data from service provider server 130, create or modify HTTP messages to include user payment data, and transmit HTTP messages to merchant server 120. Such functions are described in more detail with respect to FIGS. 3 and 4.

Furthermore, router service provider application 142 may provide one or more interfaces to interact with a customer who may desire to register the router with a transaction service provider or to register one or more endpoint devices (e.g., user device 110) with the transaction service provider. In one example, router service provider application 142 may come installed on a hardware router when it is purchased or may be downloaded later. The router service provider application 142 may include a graphical user interface (GUI) on which the user may enter user credentials for the transaction service provider and request that the router service provider application 142 may send a registration request to service provider server 130. During a registration request, router service provider application 142 may send the user account credentials (e.g., a login and password or similar credentials) for the transaction service provider associated with server provider server 130 as well as router identifying information to the transaction processing application 132. Examples of router identifying information may include a MAC address, an IP address, a serial number for the router, or similar information that may be used to identify router device 140 from other routers on the Internet.

Once the router device 140 is registered, transaction processing application 132 may generate an authorization token and send that authorization token to router service provider application 142. In response, router service provider application 142 may store that authorization token to memory device 144.

Similarly, router service provider application 142 may track endpoint devices that are serviced by LAN 190 and provide an option for a user to register one or more of those endpoint devices. In one example, a GUI a present a list of devices that are communicating with LAN 190 at a given time, allowing the user to select ones of those devices to register with transaction processing application 132. Upon indication by a user, the router service provider application 142 may then send a registration request to transaction processing application 132, the request including identifying information for the endpoint device (e.g., MAC address, IP address, serial number) and the authorization token. Transaction processing application 132 may then store identifying information of registered routers and endpoint devices at database 136, thereby linking registered routers and endpoint devices with user accounts. Transaction processing application 132 may then search database 136 to verify an authorization token as well as to verify a registration status of a given router or endpoint device during transaction requests.

Memory device 144 may include volatile or nonvolatile memory, such as Static RAM (SRAM), Dynamic RAM (DRAM), flash RAM, a hard disk drive, or the like. In some embodiments, memory device 144 is implemented using flash RAM, so that data stored there may persist even though router device 140 may be powered down. As noted above, memory device 144 may store the authorization token, and in various embodiments may store other data, such as the code base of router service provider application 142, any other applications (not shown) and the like.

In some embodiments, router service provider application 142 may be implemented as a wireless router, providing wireless service according to IEEE 802.11x or other appropriate wireless protocol. Thus, router device 140 may include one or more antennas to service devices such as user device 110 communicating with LAN 190. Router device 140 may also include one or more Ethernet ports or other appropriate ports to communicate with a modem and, by extension, an ISP. Additionally, router device 140 may be implemented as a soft router, where the routing functionality is provided by an application executed by a server or laptop computer.

Communication module 148 may be adapted to communicate with network 160 and LAN 190 through any of a variety of wired or wireless protocols. In various embodiments, communication module 148 may include an Ethernet device, and IEEE 802.11x device, antennas, wired ports, network interface cards, and the like to facilitate communication with networks and devices. Furthermore, LAN 190 is serviced by router device 140, and it is understood that LAN 190 may support any number of endpoint devices, of which user device 110 is one.

User device 110 may be implemented as a communication device that may utilize appropriate hardware and software configured for wired and/or wireless communication with merchant server 120 and/or service provider server 130 via the router device 140. For example, in one embodiment, user device 110 may be implemented as a personal computer (PC), a smart phone, laptop/tablet computer, wristwatch with appropriate computer hardware resources, eyeglasses with appropriate computer hardware, other type of wearable computing device, implantable communication devices, and/or other types of computing devices capable of transmitting and/or receiving data, such as an IPAD® from APPLE®. Examples of operating systems for use with user device 110 include iOS® OS, Android® OS, and the like. User device 110 may be managed or controlled by any suitable processing device. Although only one user device 110 is shown, a plurality of like user devices may function similarly.

User device 110 of FIG. 1 contains a user service provider application 112, other applications 114, and a communication module 118. User service provider application 112 and other applications 114 may correspond to executable processes, procedures, and/or applications with associated hardware. In other embodiments, user device 110 may include additional or different modules having specialized hardware and/or software as required.

User service provider application 112 may correspond to one or more processes to execute modules and associated devices of user device 110 to initiate, receive, and/or process/complete transactions using services provided by service provider server 130. In this regard, user service provider application 112 may correspond to specialized hardware and/or software utilized by user device 110 to provide an interface to permit the user associated with user device 110 to select payment options and provide payment for items, for example, to a merchant through merchant server 120 using service provider server 130.

In various embodiments, user service provider application 112 may also provide payments and/or transfers to users and/or groups of users, for example, payments to individual sellers or friends for items and/or transfers between known associates. User service provider application 112 may be implemented as a user interface enabling the user to enter payment options for storage by user device 110 (e.g., using a digital wallet), select and provide payment options on checkout/payment of one or more items with a merchant, and complete a transaction for the item(s) through a purchase request for the item(s). In various embodiments, user service provider application 112 may correspond to a general browser application configured to retrieve, present, and communicate information over the Internet (e.g., utilize resources on the World Wide Web) or a private network. For example, user service provider application 112 may provide a web browser, which may send and receive information over network 160, including retrieving website information, presenting the website information to the user, and/or communicating information to the website, including payment data. However, in other embodiments, user service provider application 112 may include a dedicated application of service provider server 130 or other entity (e.g., a merchant), which may be configured to assist in processing electronic transaction requests. User service provider application 112 may be utilized to establish and/or maintain a user account and/or digital wallet with service provider server 130.

In an example embodiment, user service provider application 112 may facilitate a transaction between user device 110 and merchant server 120. For instance, during a transaction, user service provider application 112 may communicate with merchant web application 122 via LAN 190, router device 140, and network 160.

In various embodiments, user device 110 includes other applications 114 as may be desired in particular embodiments to provide features to user device 110. For example, other applications 114 may include email, texting, voice and IM applications that allow a user to send and receive emails, calls, texts, and other notifications through network 160. Other applications 114 may contain software programs, executable by a processor, including a graphical user interface (GUI) configured to provide an interface to the user.

User device 110 includes at least one communication module 118 adapted to communicate with merchant server 120 and/or service provider server 130 via LAN 190, router device 140, and network 160. In various embodiments, communication module 118 may include an Ethernet device, an IEEE 802 11x device, or other appropriate device to communicate with router device 140. However, the scope of embodiments is not limited to those communication techniques, as user device 110 may robust communication functionality compatible with cellular data, Bluetooth, and the like.

Merchant server 120 in this example includes a server that may be accessed via network 160 by a variety of different user devices, wherein user device 110 is one example. Merchant server 120 may be maintained, for example, by a merchant having a customer-facing website or other transaction functionality (e.g., through a specialized merchant application). In this regard, merchant server 120 may include a device having processing applications, which may be configured to interact with user device 110 and/or service provider server 130 to engage in transactions, including over network 160 with user device 110 for exchange of transaction information and token data. Merchant server 120 may be implemented using any appropriate hardware and software configured for wired and/or wireless communication with user device 110 and/or service provider server 130. For example, in one embodiment, merchant server 120 may be implemented as a single or networked personal computer (PC), a smart phone, laptop computer, wearable computing device, and/or other types of computing devices at a merchant location capable of transmitting and/or receiving data. In one particular use case, merchant server 120 includes a commodity server running LINUX® OS and acting as a web server to facilitate a merchant website.

Merchant server 120 of FIG. 1 contains a merchant web application 122, and a communication module 128. Merchant payment service application 122 may correspond to processes, procedures, and/or applications executable by a hardware processor, for example, a software program. In other embodiments, merchant server 120 may include additional or different modules having specialized hardware and/or software as required.

Merchant web application 122 may correspond to one or more processes to execute modules and associated specialized hardware of merchant server 120 that provide checkout and payment processes for a transaction to purchase one or more items for sale from the merchant corresponding to merchant server 120. In this regard, merchant web application 122 may correspond to a comprehensive e-commerce web site.

In certain embodiments, merchant web application 122 may correspond more generally to a website of the merchant. Thus, merchant web application 122 may provide item sales through an online marketplace using the website of the merchant.

Merchant web application 122 may be adapted to receive HTTP messages from user service provider application 112 and to accept payment therefrom. In one example, user service provider application 112 inserts a request for payment into a header of an HTTP message, wherein that header is manipulated by router service provider application 142 to include user payment data. Thus, in some embodiments merchant web application 122 is pre-programmed to understand particular header formats that may include payment data. In another example, merchant web application 122 may receive user payment data via one or more fields defined by its own website, and merchant web application 122 may in such embodiments be unaware of the role router device 140 plays in managing payment.

Merchant server 120 includes at least one communication module 128 adapted to communicate with user device 110 and/or payment provider server 130. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online or mobile electronic transaction service provider, which may provide payment services and/or processing for electronic transactions on behalf of users. In this regard, service provider server 130 includes one or more processing applications which may be configured to interact with user device 110, merchant server 120, router device 140, and/or another device/server to facilitate payment for a transaction, including establishment of accounts and configuration of mobile device applications to use an acceptance mechanism for electronic payments by a merchant. In one example, service provider server 130 may be provided by PAYPAL®, Inc. of San Jose, Calif., USA. However, in other embodiments, service provider server 130 may be maintained by or include a credit provider, payment services provider, financial data provider, and/or other service provider, which may provide payment services to the user.

Service provider server 130 of FIG. 1 includes a transaction processing application 132, a database 136, and a network interface component 138. Transaction processing application 132 may correspond to executable processes, procedures, and/or applications with associated hardware. In other embodiments, service provider server 130 may include additional or different modules having specialized hardware and/or software as required.

As noted above, transaction processing application 132 may interact with router service provider application 142 over network 160 to receive user account login information, router identifying information, and endpoint identification information in order to register router device 140 and user device 110. Transaction processing application 132 may further interact with router service provider application 142 over network 160 to provide user payment data in response to receiving an authorization token. Further functions of transaction processing application 132 are described in more detail below with respect to FIG. 3.

Transaction processing application 132 may correspond to one or more processes to execute modules and associated specialized hardware of service provider server 130 to receive and/or transmit information from user device 110 for establishing payment accounts, as well as processing and completing of one or more transactions between the user of user device 110 and the merchant of merchant server 120. In this regard, transaction processing application 132 may correspond to specialized hardware and/or software to establish user accounts, which may be utilized to send and receive electronic data needed to facilitate electronic transactions.

A user associated with user device 110 may establish an account with transaction processing application 132 by providing personal and/or financial information to payment provider server 130 and selecting an account login, password, and other security information. The account may be used for conducting an electronic transaction, such as to send and receive payments.

Transaction processing application 132 may receive a transaction request from merchant server 120 for a transaction between the user of user device 110 and the merchant for merchant server 120, which may include IDs, tokens, or other data used for transaction processing. The transaction is completed and payment is provided.

Additionally, service provider server 130 includes database 136. As previously discussed, the entity corresponding to user device 110 may establish one or more payment accounts with service provider server 130. Payment accounts in database 136 may include entity information, such as name, address, birthdate, payment/funding information, additional user financial information, and/or other desired user data. The entity may link to their respective payment accounts and/or digital wallets through an account, user, merchant, and/or device ID, as well as a generated token, which may be provided to user device 110 and/or merchant server 120 for use.

Furthermore, as noted above, database 136 may also include data linking router device 140 and user device 110 to a particular account or digital wallet associated with the user. For instance, database 136 may include one or more tables that associate endpoint device information (e.g., serial number, MAC address, IP address), router device information (e.g., serial number, MAC address, IP address), and user account and digital wallet information. Such information may allow transaction processing application 132 to verify that router device 140 is properly registered, user device 110 is properly registered, and that an authorization token is valid and linked to at least one user account or digital wallet. For instance, in a given transaction, transaction processing application 132 may parse the database 136, using any appropriate piece of information as a key, to identify router device 140, user device 110, or a particular digital wallet in order to determine whether to send user payment data to router device 140. Additionally, transaction processing application 132 may further interact with the merchant web application 122 to settle payment once merchant web application 122 has received the user payment data from router device 140.

In various embodiments, service provider server 130 includes at least one network interface component 138 adapted to communicate user device 110 and/or merchant server 120 over network 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
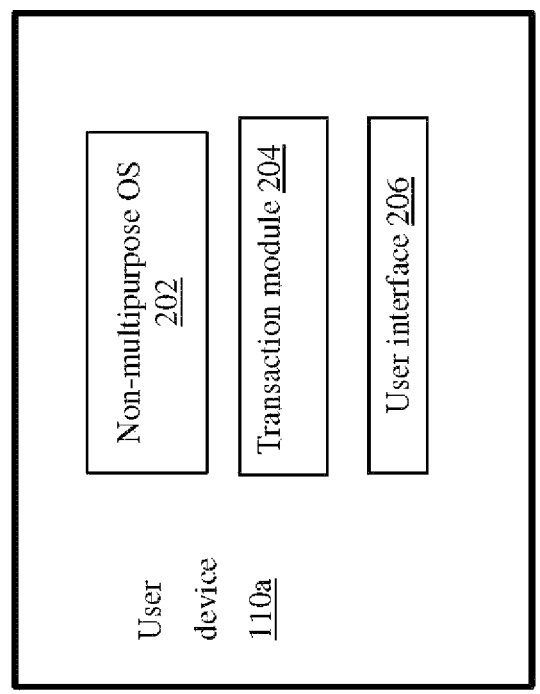
FIG. 2 is a schematic diagram of an example Internet of things (IOT) device that may be adapted for use in the embodiment of FIG. 1.

FIG. 2 illustration of an IOT device 110a, which may be used in various embodiments. For instance, while FIG. 1 illustrates user device 110 being in communication with router device 140 over LAN 190, various embodiments may additionally or alternatively include IOT device 110a to complete transactions with the help of router device 140. In contrast to user device 110, user device 110a may include less robust functionality, less power consumption, less processing power, less memory, and less interface complexity. Examples of IOT devices that may be adapted for use in various embodiments include push-button ordering devices (e.g., AMAZON DASH™ push-button ordering devices), smart refrigerators, home automation hubs, home monitoring systems, smart televisions, and the like.

In this example, user device 110a includes a non-multi-purpose operating system 202, which may in some embodiments not allow a user to install applications. However, other embodiments may allow limited ability for a user to update or install applications. User device 110a may also include a transaction module 204, which is operable to initiate a transaction and send a payment request to merchant server 120 via router device 140. For instance, transaction module 204 may be able to generate HTTP messages including nonstandard headers to request payment by the router service provider application 142 or may be able to generate HTTP messages in concert with application 142 to allow application 142 to insert user payment data either in a body or a header of an HTTP message that is sent to merchant server 120.

Continuing with the example, user interface 206 may be simple or complex, depending on the particular embodiment of user device 110a. In one example, a smart TV may have a fairly robust graphical user interface, whereas a push-button device may have only a single user-selectable button. Though not shown, user device 110a may also include communication hardware and software to allow it to communicate with appropriate protocols over LAN 190, to router 140, and to merchant web application 122.

Figure 3:
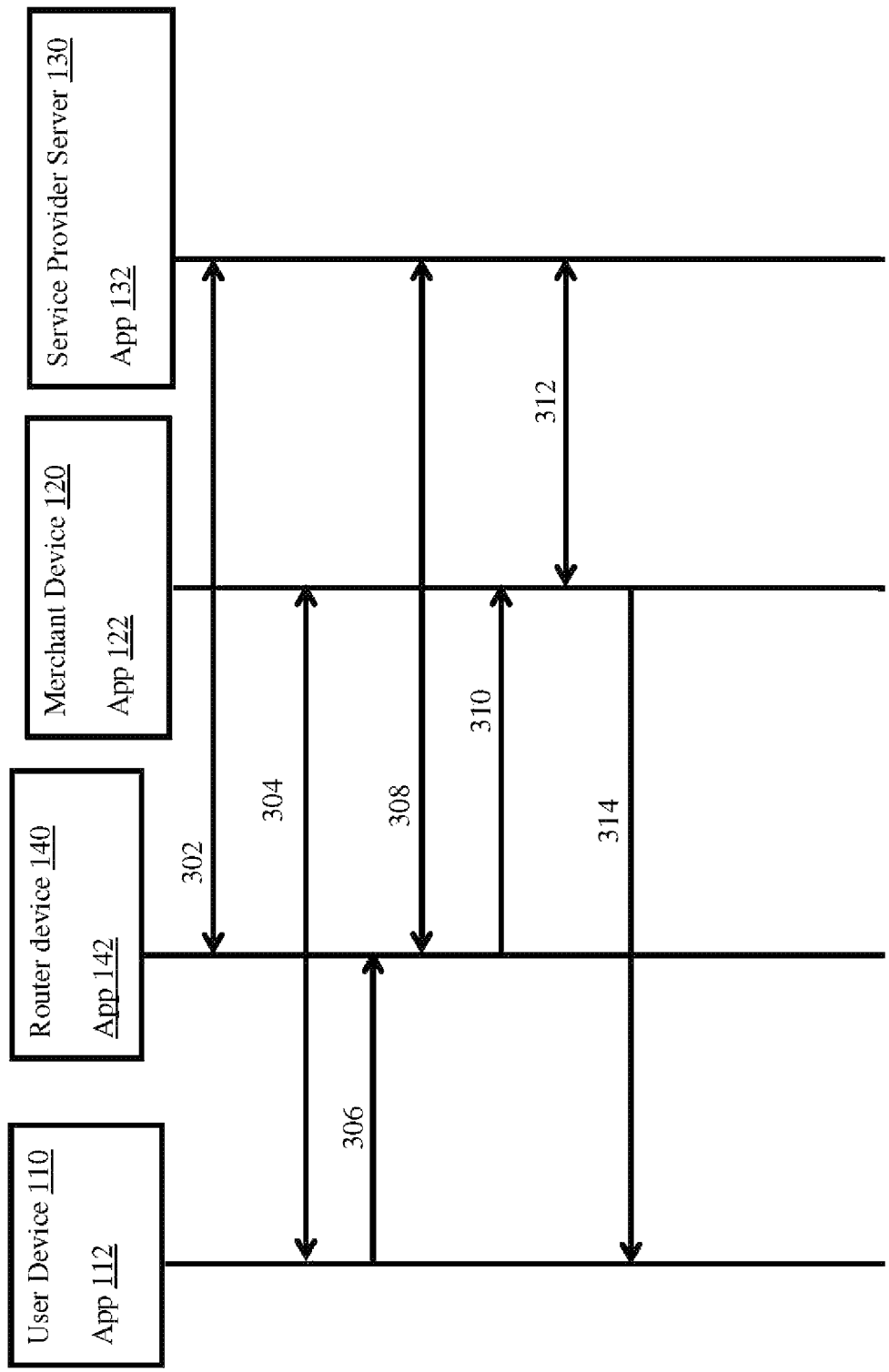
FIG. 3 is a signal diagram of an example technique for conducting an electronic transaction, according to one embodiment.

FIG. 3 is a signal diagram, adapted according to one embodiment. The signal diagram of FIG. 3 illustrates a relationship among user service provider application 112, router service provider application 142, transaction processing application 132, and merchant web application 122. User device 110, service provider server 130, merchant server 120, and router device 140 are described in more detail above with respect to FIG. 1. While FIG. 3 is shown including user device 110, various other embodiments may include user device 110a in addition to or instead of user device 110, and it is understood that user device 110a may include the same or similar functionality to communicate with router device 140 and merchant server 120 and to initiate a transaction.

FIG. 3 shows messages 302, which illustrate registration of router device 140 with service provider server 130. It is noted that messages 302 illustrate multiple messages, which may be sent using any appropriate protocol, such as a HTTP. As noted above, registration may begin with a request by a user to register either the router device 140 or user device 110 through, e.g., a GUI provided by application 142. In response, application 142 sends messages to application 132 including identification information of the router device 140 and the user device 110 and perhaps user credentials as well. Application 132 then registers router device 140 and user device 110 with an account or digital wallet of the user and then downloads an authorization token to router device 140.

Although not illustrated in FIG. 3, various embodiments may include further security for registration of router device 140 and user device 110. For instance, registration of a router device 140 and any endpoint device (e.g., user device 110) may be accompanied by multi-factor authentication, such as a Short Message Service (SMS) message to a user associated with the account with a code to be entered into the registered device.

The example of FIG. 3 continues in a scenario in which router device 140 and user device 110 are both registered and associated with a user account or digital wallet associated with server provider server 130. Furthermore, in this example, application 142 has saved the authorization token to local memory at router device 140. At messages 304, the user controls the application 112 to interact with the merchant's website at application 122. For instance, the application 112 may include a specialized application or perhaps a browser, and the user may browse one or more items provided by the website of application 122. Such communication may take place via HTTP from the perspective of application 112 at application 122. The messages 304 are routed over the Internet and between device 110 and device 122 by virtue of router device 140 operating at layer 2 or layer 3 to handle communications packet-by-packet. At the same time, application 142 also looks at the data at the application layer as well to identify HTTP posts that request payment.

Messages 306 include transaction request from application 112 to application 142. For instance, at messages 306, application 112 requests payment help from application 142 by one or more HTTP messages. For instance, application 112 may send an HTTP message (e.g., POST) to router device 140, wherein the HTTP message has a header that includes a request for payment. In one example, application 112 may structure the header so that it includes a non-standard entry (e.g., "X-Payment-Request: true"), wherein both application 112 and application 142 are pre-programmed to understand that such non-standard entry is a request for payment data. In another example, application 112 may structure the header to include an HTTP status code, such as the currently-unused 402—Payment Required, wherein both application 112 at application 142 are pre-programmed to understand that such status is a request for payment data.

In yet another example, messages 306 may or may not include a particular header, but the application 142 may recognize the HTTP messages to correspond to that of a known merchant website with a particular structure for payment data. In such an instance, the user may press a "pay now" button on an interface of application 112 without filling in the payment fields, where application 142 recognizes the message as a payment attempt.

In response to the request for payment, application 142 locates the authorization token from the local memory of router device 140 and transmits the authorization token to transaction processing application 132 at service provider server 130 by use of, e.g., an HTTP message. Further in this example, communications such as messages 308 between service provider server 130 and router device 140 may be secured using transport layer security (TLS) or other appropriate protocol. In such embodiments, certificates may be resolved at router device 140, rather than at user device 110. For instance, communications between user device 110 and router device 140 may employ Wi-Fi Protected Access II (WPA2) for security, whereas communications between the router device 140 and the upstream resources (merchant server 120 and service provider server 130) may employ HTTPS. However, various embodiments are not limited to any type of secure communication.

Continuing with messages 308, the application 132 verifies the authorization token and returns at least one HTTP message including user payment data to application 142. For instance, the authorization token may be a hash or some other alphanumeric string that provides no useful information to a third party, but is decipherable by application 132 to identify a user account or other appropriate information. The user payment data, on the other hand, may include sensitive information such as credit card numbers, a one-time payment token, or the like.

Continuing with the example, at messages 310, application 142 transmits one or more HTTP messages (e.g. POSTs) to application 122, wherein messages 310 include user payment data. In one example in which application 112 used a non-standard header information (e.g., "X-Payment-Request: true") or status code (status 402), application 142 may inject payment data into the header by either replacing the information or adding to the information. For instance, in response to "X-Payment-Request: true" application 142 may inject "X-Payment-information: aabbcc112233" into the header, wherein "aabbcc112233" represents the user payment data. In some embodiments, application 142 may inject the user payment data into a same HTTP message that application 112 intends to reach application 122.

In another example, the application 142 has recognized HTTP messages between user device 110 and merchant server 120 as conforming to a particular format for a known merchant. In such a case, the user may have already pressed a "pay now" button on an interface of application 112 without filling in the payment fields, and application 142 has recognized the message as a payment attempt. Continuing with the example, the application 142 then creates a new HTTP POST request with the payment data in the body, where the payment data is formatted to conform to the fields of a website associated with the application 122. In any event, messages 310 includes application 142 sending one or more HTTP messages to application 122 to provide payment for an electronic transaction.

At messages 312, application 122 requests payment from application 132 by passing transaction details (e.g., the dollar amount of the transaction, a date, an identification of the merchant, and the like) along with the user payment data in one or more HTTP messages. Furthermore at messages 312, application 132 may process the payment through the service provider associated with service provider server 130 or may send the payment data further through a credit card payment backend. Once payment has been confirmed, application 132 confirms payment to application 122.

Application 122 further confirms payment with application 112 at messages 314, and the transaction is complete. Further, application 142 may then delete or otherwise overwrite the user payment data from its cache or other memory registers so that it may not be compromised by a malicious user.

Figure 4:
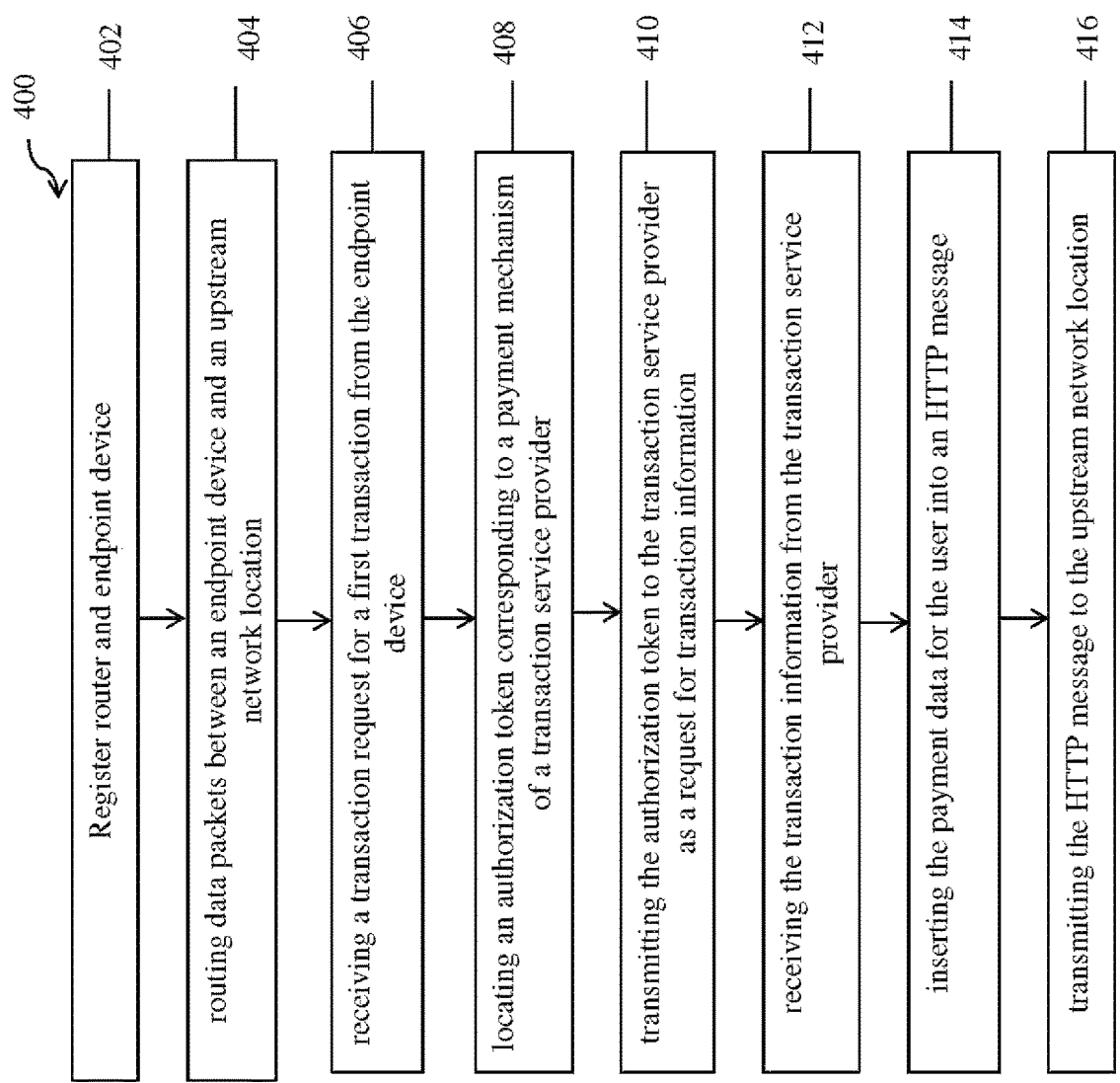
FIGS. 4 and 5 are flow charts illustrating example embodiments of methods for conducting an electronic transaction.

FIG. 4 is an illustration of an example method 400, adapted according to one embodiment. The actions of method 400 may be performed by a router device (e.g., router device 140) as it interacts with a user device (e.g., user device 110 or 110a), service provider server (service provider server 130), and a merchant server (e.g., merchant server 120). The various actions are provided by the devices as a result of executing computer-readable code by one or more processors, wherein the computer-readable code includes instructions to provide the functionality of router service provider application 142.

At action 402, the router device registers the router device and the endpoint device. An example is given above with respect to messages 302 of FIG. 3, wherein an application at the router passes user credentials and router-identifying data as well as endpoint-identifying data to a service provider server.

At action 404, the router device routes data packets between an endpoint device and an upstream network location. For instance, the router has a side that faces a LAN and a side that faces other networks (e.g., the Internet). Normal use of a user device on the LAN includes packet traffic between the endpoint device and the upstream network location. An example of an upstream network location includes a merchant website. An example is described above with respect to messages 304 of FIG. 3.

At action 406, the application at the router device receives a transaction request for a first transaction from the endpoint device. The transaction request may include any appropriate technique to identify a transaction to the router device. In one instance, the user device may send a message with a nonstandard header or a status code that indicates payment is requested. In another example, the transaction request may include web traffic between the user device and the merchant website that is recognized by the router as indicating a request for payment. An example is described above with respect to messages 306 of FIG. 3.

At action 408, the router locates an authorization token corresponding to a payment mechanism of the transaction service provider. For instance, the authorization token may include a hashed value or other values saved to a local memory of the router device that is accessed by an application on the router device in response to the transaction request of action 406.

At action 410, the router device transmits the authorization token to the transaction service provider as a request for transaction information. For instance, an application associated with the transaction service provider and installed on the router may communicate with a server application associated with the transaction service provider. Examples of transmitting the authorization token include using HTTPS communication, such as discussed above with respect to messages 308 FIG. 3.

At action 412, the router device receives the transaction information from the transaction service provider. In one example, the transaction information includes user payment data, such as a payment token, credit card information, and the like. Once again, an example is discussed above with respect to messages 308 of FIG. 3.

At action 414, the router inserts the payment data for the user into an HTTP message.

In one example, the router may insert the payment data into a header of a same HTTP message that the router then transmits the merchant website. In another example, the router may insert the payment data into a body of a new HTTP message that the router then sends on to the merchant website. Examples are discussed above with respect to messages 310 of FIG. 3. Action 416 includes transmitting the HTTP message to the upstream network location (e.g., a merchant website).

Various embodiments may include advantages over some conventional systems. For instance, storing an authorization token locally at a router device and then allowing the router device to access user payment data by using the token may allow for increased security of the electronic transaction systems. Specifically, the authorization token itself may be designed such that access by malicious user would not divulge any sensitive user account information. Furthermore, such computer systems may also include registration of both the router device and any endpoint devices, thereby preventing or minimizing unauthorized use by malicious users who might gain access to the user's LAN. Also, in case a user's credit card number is canceled and replaced, the payment service provider and router may provide a centralized point where the credit card information may be updated and still be kept secure. This is in contrast to a scenario wherein the user has no other choice but to update the credit card information in a multitude of different merchant websites. Furthermore, the embodiments described above may provide efficiency in the network by adding little or no overhead while at the same time improving ease and security.

The scope of embodiments is not limited to techniques including transmitting user payment data from the transaction service provider to the router or transmitting user payment data from the router to the merchant. Rather, other embodiments may be implemented in a system to provide increased security by avoiding or minimizing the transmission of user payment data. Specifically, some embodiments may employ the router device in a transaction that begins with an endpoint device (e.g., a smart phone, laptop, IOT device) transmitting a transaction request to a merchant web server. For instance, the transaction request may request to buy X number of widgets.

Continuing with the example, in response to the transaction request, the router may authenticate itself with respect to an account at the transaction service provider. For instance, the router may be registered with the transaction service provider and transmit an authorization token or other indication such as serial number, MAC address, or IP address of the router to the transaction service provider. Such information may be included in a payment request that is generated by the router and transmitted to the transaction service provider. The payment request may also include identifying information for the transaction, such as a transaction identification number, a merchant identification, a payment amount, or the like.

The transaction service provider may process and approve the transaction by contacting an issuing bank of a credit card, which is linked to the account of the user through the transaction service provider, and initiating payment. The transaction service provider may also initiate payment if the form of payment is an automated clearinghouse (ACH) draft. Once payment is initiated, the transaction service provider transmits a confirmation message to the merchant to indicate to the merchant that the order has been approved and payment is being processed. The merchant may then see the confirmatory message and begin processing the order as well as confirming to the user that the order has been placed.

An advantage of such embodiments may include that the transaction service provider may add security for the consumer by shielding payment details from the merchant or a malicious third-party.

Figure 5:
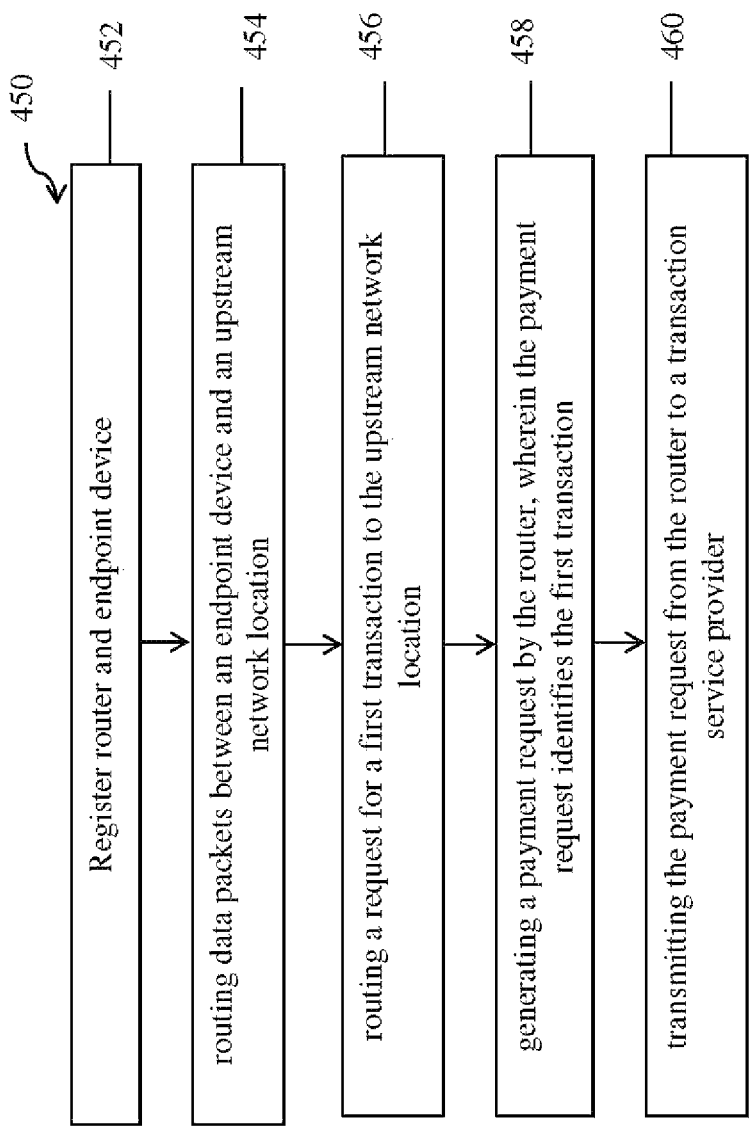

FIG. 5 is an illustration of an example method 450, adapted according to one embodiment and, specifically, adapted to the scenario described above. The actions of method 450 may be performed by a router device (e.g., router device 140) as it interacts with a user device (e.g., user device 110 or 110*a*), service provider server (service provider server 130), and a merchant server (e.g., merchant server 120). The various actions are provided by the devices as a result of executing computer-readable code by one or more processors, wherein the computer-readable code includes instructions to provide the functionality of router service provider application 142. Furthermore, the messages sent between the various devices may be the same as or similar to those described above with respect to FIG. 3.

Actions 452-454 are the same as or similar to actions 402-404 of FIG. 4 and are described above in more detail. Action 456 may include the router routing a request for a first transaction from the endpoint device to the upstream network location. For instance, in a scenario wherein the endpoint device is a laptop or smart phone, the user may browse merchandise or services from the merchant's website and select items for purchase. In an example in which the endpoint device includes an IOT device, there may or may not be browsing, but in any event, the endpoint device transmits a request for a first transaction, which is routed by the router itself to the network and on to the upstream network location.

Action 458 includes the router generating a payment request associated with the first transaction. For instance, the router may be able to recognize a transaction request by information in a header of an HTTP message such as "X-Payment-Request: true," status code 402, or other appropriate information. Additionally or alternatively, the router may be programmed to recognize formats associated with transaction requests for a plurality of different merchants. In some embodiments, the router may read information from the messages that make up the transaction request. For instance, the router may read the messages to determine a transaction amount, a transaction number or order number, an identification of the merchant, or other appropriate information. Additionally or alternatively, the transaction request may include bidirectional traffic between the endpoint device and the merchant, wherein the router may read information from a message sent from the merchant to the endpoint device as part of the transaction request to determine the merchant identification, a transaction number or order number, the transaction amount, etc.

In response to the first transaction, the router generates a new payment request, and that payment request may include any appropriate information to facilitate payment. Examples of such information may include an identification of the merchant, an order number or transaction number associated with the transaction, a purchase amount, or the like.

Furthermore, the router and the endpoint device may be registered with the transaction service provider. The router may demonstrate its authorization in any appropriate manner. In one example, the router may include an authorization token (as discussed in the example of FIG. 4) in the payment request. The router may also identify itself by its serial number, its MAC address, its IP address, etc. In fact, in some embodiments the router may identify itself through serial number, MAC address, IP address, or other characteristic instead of or in addition to an authorization token. The router may further generate the payment request to include identifying information of the endpoint device, such as a serial number, MAC address, or IP address of the endpoint device.

At action 460, the router transmits the payment request to the transaction service provider. For instance, communications between the router and the endpoint device and between the router and the transaction service provider may include a plurality of data packets at one level and may include HTTP messages at another level.

Continuing with the example, the transaction service provider may then receive the payment request and verify the authenticity of the payment request by comparing an identification of the router, an identification of the endpoint device, and perhaps the authentication token, with its own records for known user accounts. Assuming that the information in the payment request is verified and confirmed, the transaction service provider may begin the payment process by contacting a credit card issuing bank or a bank otherwise associated with the user's account. For instance, the transaction service provider may contact a credit card issuing bank to check the user's available credit limit, verify that the existing balance is sufficient, or in the case of debit/bank, the transaction service provider may use an algorithm to determine that an ACH draft most likely will not bounce.

Assuming that the funds or credit of the user is sufficient, the transaction service provider may direct the bank to make payment to the merchant in a message that may include an identification of the merchant, an order or transaction number, a transaction amount (e.g., in dollars) or any other useful information. The transaction service provider then confirms to the merchant that payment is approved, and the merchant may then also confirm to the endpoint device that the transaction has been approved and is proceeding.

Figure 6:
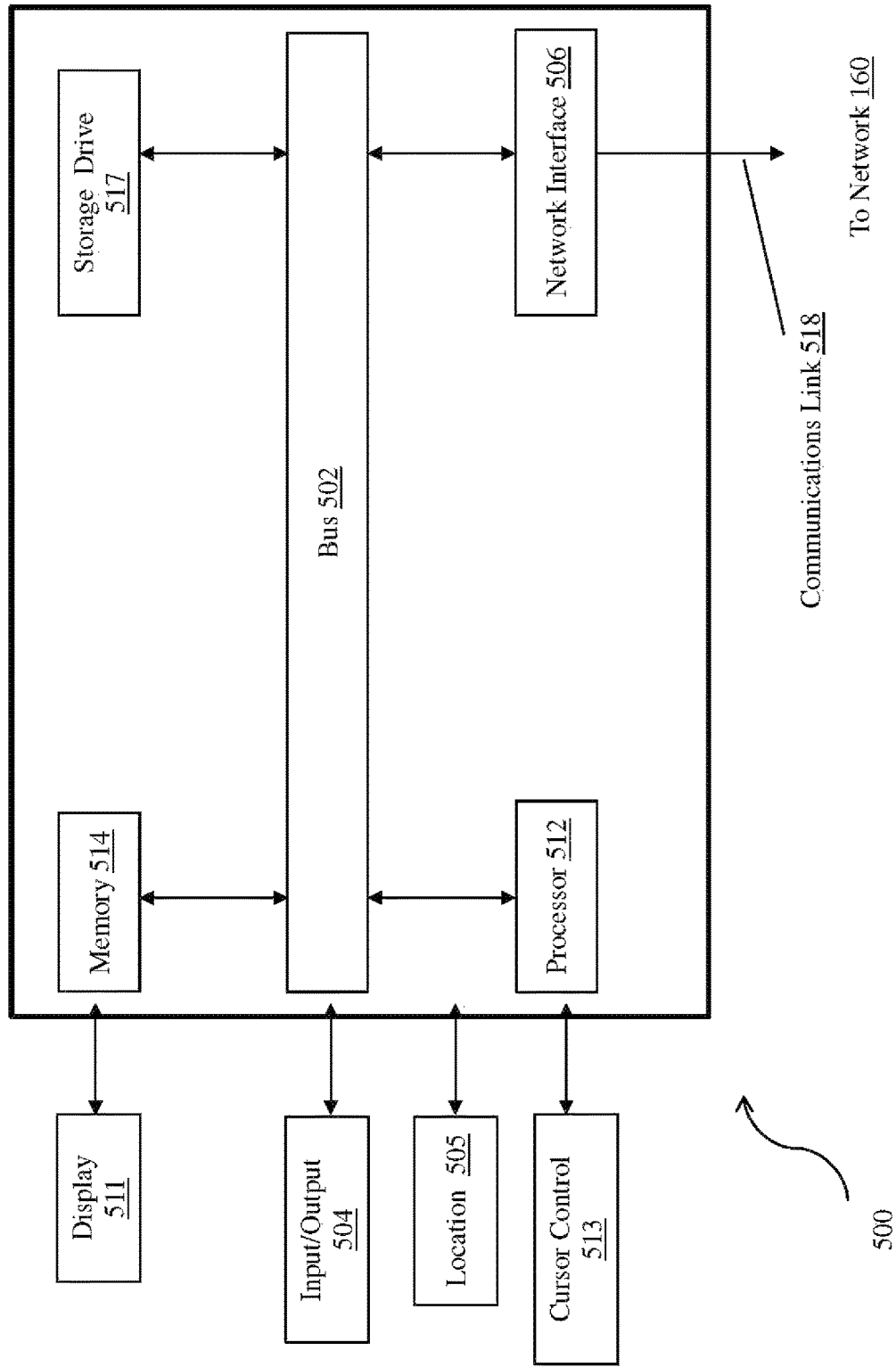
FIG. 6 is an illustration of an example computer system that may be used as a user device, a service provider server, a router, or a merchant device and to perform the actions described with respect to FIGS. 1-5, according to one embodiment.

Referring now to FIG. 6, an embodiment of a computer system 500 suitable for implementing, for example, the computing devices 110, 120, 130, and 140 of FIG. 1 discussed above. It should be appreciated that other devices utilized by payer, payees, and payment service providers in the system discussed above may be implemented as the computer system 500 in a manner as follows.

In accordance with various embodiments of the present disclosure, computer system 500, such as a smart phone, computer, router device, and/or a network server, includes a bus 502 or other communication mechanism for communicating information, which interconnects subsystems and components, such as a processing component 512 (e.g., processor, micro-controller, digital signal processor (DSP), etc.), a system memory component 514 (e.g., RAM) a storage drive component 517 (e.g., solid-state, hard drive, or optical), a network interface component 506 (e.g., wireless card, modem, or Ethernet card), a display component 511 (e.g., a touchscreen, CRT, or LCD), an input/output component 504 (e.g., keyboard, keypad, a touchscreen), a cursor control component 513 (e.g., mouse, pointer, or trackball), and/or a location determination component 505 (e.g., a Global Positioning System (GPS) device as illustrated, a cell tower triangulation device, and/or a variety of other location determination devices known in the art.) In one implementation, the storage drive component 517 may comprise a database having one or more storage drive components.

In accordance with embodiments of the present disclosure, the computer system 500 performs specific operations by the processor 512 executing one or more sequences of instructions contained in the memory component 514, such as described herein with respect to FIGS. 1-5 discussed above. Such instructions may be read into the system memory component 514 from another computer readable medium, such as storage drive 517. In other embodiments, hard-wired circuitry may be used in place of or in combination with software instructions to implement the present disclosure.

Logic may be encoded in a computer readable medium, which may refer to any tangible a non-transitory medium that participates in providing instructions to the processor 512 for execution. Such a medium may take many forms, including but not limited to, non-volatile media and volatile media. In various implementations, non-volatile media includes hard drive or solid state drives, such as the storage drive component 517, and volatile media includes dynamic memory, such as the system memory component 514.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 500. In various other embodiments of the present disclosure, a plurality of the computer systems 500 coupled by a communication link 518 to the network 160 (e.g., such as a LAN, WLAN, PTSN, and/or various other wired or wireless networks, including telecommunications, mobile, and cellular phone networks) may perform instruction sequences to practice the present disclosure in coordination with one another.

The computer system 500 may transmit and receive messages, data, information and instructions, including one or more programs (i.e., application code) through the communication link 518 and the network interface component 506. The network interface component 506 may include an antenna, either separate or integrated, to enable transmission and reception via the communication link 518. Received program code may be executed by processor 512 as received and/or stored in storage drive component 517 or some other non-volatile storage component for execution.

The present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A wireless router, comprising:
    an antenna operable to wirelessly receive and transmit data packets;
    a processor; and
    a non-transitory computer-readable medium having stored thereon instructions that are executable to cause wireless router to perform operations comprising:
        wirelessly receiving, via the antenna, outbound data packets from an endpoint device having a first network address and transmitting the outbound data packets to a system at a second network address;
        receiving inbound data packets and transmitting the inbound data packets to one or more endpoint devices wirelessly connected to the wireless router via the antenna;
        receiving a request for a first transaction from the endpoint device, the request associated with the system at the second network address;
        generating a payment request that includes identifying information for the first transaction, the generating comprising: including, in the payment request, a payment authorization token that is stored within the wireless router; and
        based on information contained in the payment authorization token, transmitting the payment request, including the payment authorization token, from the wireless router to a transaction service provider system.

2. The wireless router of claim 1, wherein the second network address is a remote network address on an Internet and wherein the system at the second network address is not directly wirelessly connected to the wireless router.

3. The wireless router of claim 1, wherein the operations further comprise:
    transmitting a registration request received from the endpoint device to the transaction service provider system.

4. The wireless router of claim 3, wherein the operations further comprise:
    providing a registration user interface to a user via a computing device of the user, wherein the registration user interface is configured to allow the user to register a plurality of endpoint devices with the transaction service provider system.

5. The wireless router of claim 1, wherein the payment request includes an identification of a merchant associated with the system at the second network address and a transaction amount.

6. The wireless router of claim 1, wherein the payment request includes identifying information of the endpoint device, and wherein the endpoint device is registered with the transaction service provider system.

7. The wireless router of claim 1, wherein the payment request includes identifying information of the wireless router, the identifying information including at least one of:
    a serial number of the wireless router;
    a Media Access Control (MAC) address of the wireless router; or
    an Internet Protocol (IP) address of the wireless router.

8. A method, comprising:
    wirelessly receiving, via an antenna of a wireless router, outbound data packets from an endpoint device having a first network address and transmitting the outbound data packets to a system at a second network address;
    receiving inbound data packets and transmitting the inbound data packets to one or more endpoint devices wirelessly connected to the wireless router via the antenna;
    receiving a request for a first transaction from the endpoint device, the request associated with the system at the second network address;
    generating a payment request that includes identifying information for the first transaction, the generating comprising: including, in the payment request, a payment authorization token that is stored within the wireless router; and
    based on information contained in the payment authorization token, transmitting the payment request, including the payment authorization token, from the wireless router to a transaction service provider system.

9. The method of claim 8, wherein the second network address is a remote network address on an Internet, and wherein the system at the second network address is not directly wirelessly connected to the wireless router.

10. The method of claim 8, further comprising: transmitting a registration request received from the endpoint device to the transaction service provider system.

11. The method of claim 10, further comprising: providing a registration user interface to a user via a computing device of the user, wherein the registration user interface is configured to allow the user to register a plurality of endpoint devices with the transaction service provider system.

12. The method of claim 8, wherein the payment request includes an identification of a merchant associated with the system at the second network address and a transaction amount.

13. The method of claim 8, wherein the payment request includes identifying information of the endpoint device, and wherein the endpoint device is registered with the transaction service provider system.

14. The method of claim 8, wherein the payment request includes identifying information of the wireless router, the identifying information including at least one of:
    a serial number of the wireless router;
    a Media Access Control (MAC) address of the wireless router; or
    an Internet Protocol (IP) address of the wireless router.

15. A system, comprising:
a processor; and
a non-transitory computer-readable medium having stored thereon instructions that are executable by the processor to cause the system to perform operations comprising:
- wirelessly receiving, via an antenna of a wireless router, outbound data packets from an endpoint device having a first network address and transmitting the outbound data packets to a system at a second network address;
- receiving inbound data packets and transmitting the inbound data packets to one or more endpoint devices wirelessly connected to the wireless router via the antenna;
- receiving a request for a first transaction from the endpoint device, the request associated with the system at the second network address;
- generating a payment request that includes identifying information for the first transaction, the generating comprising: including, in the payment request, a payment authorization token that is stored within the wireless router; and
- based on information contained in the payment authorization token, transmitting the payment request, including the payment authorization token, from the wireless router to a transaction service provider system.

16. The system of claim 15, wherein the second network address is a remote network address on an Internet, and wherein the system at the second network address is not directly wirelessly connected to the wireless router.

17. The system of claim 15, wherein the operations further comprise:
- transmitting a registration request received from the endpoint device to the transaction service provider system; and
- providing a registration user interface to a user via a computing device of the user, wherein the registration user interface is configured to allow the user to register a plurality of endpoint devices with the transaction service provider system.

18. The system of claim 15, wherein the payment request includes an identification of a merchant associated with the system at the second network address and a transaction amount.

19. The system of claim 15, wherein the payment request includes identifying information of the endpoint device, and wherein the endpoint device is registered with the transaction service provider system.

20. The system of claim 15, wherein the payment request includes identifying information of the wireless router, the identifying information including at least one of:
- a serial number of the wireless router;
- a Media Access Control (MAC) address of the wireless router; or
- an Internet Protocol (IP) address of the wireless router.

* * * * *